(12) United States Patent
Soltis, Jr.

(10) Patent No.: US 6,871,264 B2
(45) Date of Patent: Mar. 22, 2005

(54) SYSTEM AND METHOD FOR DYNAMIC PROCESSOR CORE AND CACHE PARTITIONING ON LARGE-SCALE MULTITHREADED, MULTIPROCESSOR INTEGRATED CIRCUITS

(75) Inventor: Donald C. Soltis, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 194 days.

(21) Appl. No.: 10/092,645

(22) Filed: Mar. 6, 2002

(65) Prior Publication Data

US 2003/0172234 A1 Sep. 11, 2003

(51) Int. Cl.[7] .............................................. G06F 12/08
(52) U.S. Cl. ........................ 711/122; 711/123; 711/129; 711/143
(58) Field of Search .......................... 711/118–120, 122, 711/129, 133, 143, 153–154, 173; 712/13–15; 709/226, 104

(56) References Cited

U.S. PATENT DOCUMENTS

| | | | | |
|---|---|---|---|---|
| 5,809,537 A | * | 9/1998 | Itskin et al. ................ | 711/146 |
| 6,381,682 B2 | * | 4/2002 | Noel et al. .................. | 711/153 |
| 6,438,653 B1 | * | 8/2002 | Akashi et al. .............. | 711/128 |
| 6,460,122 B1 | * | 10/2002 | Otterness et al. .......... | 711/154 |
| 6,604,174 B1 | * | 8/2003 | Dean et al. ................. | 711/131 |
| 6,681,296 B2 | * | 1/2004 | Liao et al. .................. | 711/129 |

\* cited by examiner

*Primary Examiner*—Mano Padmanabhan
*Assistant Examiner*—Pierre M. Vital

(57) ABSTRACT

A processor integrated circuit capable of executing more than one instruction stream has two or more processors. Each processor accesses instructions and data through a cache controller. There are multiple blocks of cache memory. Some blocks of cache memory may optionally be directly attached to particular cache controllers. The cache controllers access at least some of the multiple blocks of cache memory through high speed interconnect, these blocks being dynamically allocable to more than one cache controller. A resource allocation controller determines which cache memory controller has access to the dynamically allocable cache memory block. In an embodiment the cache controllers and cache memory blocks are associated with second level cache, each processor accesses the second level cache controllers upon missing in a first level cache of fixed size.

11 Claims, 3 Drawing Sheets

SYSTEM AND METHOD FOR DYNAMIC PROCESSOR CORE AND CACHE PARTITIONING ON LARGE-SCALE MULTITHREADED, MULTIPROCESSOR INTEGRATED CIRCUITS

FIELD OF THE INVENTION

The invention pertains to the field of design and packaging of large, complex, integrated circuits such as multiprocessor circuits. In particular, the invention relates to an apparatus and method for dynamically repartitioning Multiple CPU integrated circuits so that critical-path threads may receive needed resources and system performance may thereby be optimized.

BACKGROUND OF THE INVENTION

Modern integrated processor circuits of high performance are fabricated with at least some cache memory on the processor integrated circuit. Typically cache is designed as multiple blocks of memory cells, together with control logic. Some of these circuits have been designed with bonding options such that a portion of cache may be disabled; a technique that permits product differentiation as well as sale of partially defective circuits. Some of these circuits also have spare blocks of memory that can be substituted for defective sections of cache. Typically cache is designed as multiple blocks of memory cells, together with control logic.

Much modern software is written to take advantage of multiple processor machines. This software typically is written to use multiple threads. Each thread has a sequence of instructions that can be independently scheduled for execution. Typically, at any given time some threads may be in a "wait" mode, where execution is delayed until some other thread completes an action or an external event occurs, while other threads may be ready for execution.

Software is also frequently able to prioritize those threads, determining which thread should receive the most resources at a particular time. For example, the Windows 2000 (trademark of Microsoft), VMS (trademark of Compaq Computer), and UNIX operating systems all maintain thread priorities, which are often derived from an administrator-set base priority. These operating systems use these priorities to determine which threads should execute, and to determine an amount of time each thread should execute before it is preempted by another thread.

In a multiple processor machine, each processor may be tasked with executing different threads from among those threads that are ready for execution. These threads may belong to the same, or a different, application program, or may be associated with system tasks. Such machines are often capable of doing more useful work than machines having a single processor.

Multithreaded processors are those that have more than one instruction counter, typically have a register set associated with each instruction counter, and are capable of executing more than one instruction stream. For example, machines are known wherein a single pipelined execution unit is timeshared among several instruction streams. Since the execution unit is timeshared, each instruction stream tends to execute somewhat slowly. Multithreaded machines with a timeshared, single, execution unit appear to software as multiple, independent, processors.

Machines of superscalar performance, having multiple processors on single integrated circuits, where each processor is capable of dispatching multiple instructions in some cycles, are known. Machines of this type include the IBM Power-4 and the PA 8800. Typically, each processor on these integrated circuits has its own dedicated set of execution unit pipelines and cache. Their die area, and therefore cost, for execution units is therefore typically much greater than with a timeshared multithreaded machine. These superscalar multiple-processor circuits are also capable of executing multiple threads and can be regarded as a form of high-performance multithreaded machine.

Modern processor integrated circuits are frequently fabricated with cache memory. Cache memory offers substantially faster access than main memory; but offers that fast access only for information found in the cache. Memory references that are found in cache are called "hits" in the cache, while references not found in cache are called cache "misses." The ratio of cache hits to total memory references is the "hit rate," and is known to be a function of cache size, cache architecture including the number of "ways" of associativity of the cache, and the nature of the executing thread.

It is known that cache hit rates can be measured by using counters to count cache hits and memory references. Such counters can be read and a hit rate computed. It is also known that a low hit rate can drastically impair system performance.

It is known that some threads require larger cache size to achieve high hit rates than others. It is also known that processor performance can be adversely affected, sometimes seriously, by a low hit rate in cache. It is therefore necessary to provide sufficient cache to support high hit rates for all or most threads if maximum processor performance is to be attained. Large cache sizes are, however, expensive. Manufacturers therefore market integrated circuits having similar processors with different cache sizes to different markets where application programs, and cache requirements, are expected to differ.

Cache of multiple processor integrated circuits is typically limited in size by processing costs. Large integrated circuits typically have fabrication cost that is an exponential function of their circuit area, and in some circuits as much as half of the integrated circuit area is cache and cache memory control circuitry.

Multiple-processor integrated circuits typically have predetermined amounts of cache allocated to each processor. These circuits therefore typically require an amount of total cache equal to the number of processors multiplied by the cache required to achieve a high hit rate on the most cache intensive thread expected to run.

Multiple-processor and multithreaded machines are known that are capable of simultaneously executing multiple operating systems. These are partitionable machines. Typically, each operating system is run on a partition, where a partition is assigned one or more processors, suitable sections of main memory, and other system resources. Each partition is typically configured as a virtual machine, which may have dedicated disk space or may share disk space with other partitions. Machines exist that are capable of running Windows NT (Trademark of Microsoft) in one partition, while running UNIX in another partition. Machines also exist that are capable of simultaneously running several copies of the same operating system with each copy running independently in a separate partition. These machines are advantageous in that each partition may be dedicated to particular users and applications, and problems (including system crashes) that arise in one partition need not adversely affect operation in other partitions.

It is known that execution time on multiple-processor and multithreaded machines may be billed according to the number of processors, the amount of memory, and the amount of disk space assigned to each partition. It is also known that one or more multiple-processor or multithreaded integrated circuits may be used as processors in partitionable machines.

Nature of the Problem

It would be advantageous to dynamically allocate cache to processors on a multiple processor integrated circuit, including on such integrated circuits that are parts of partitionable machines, so as to provide an amount of cache appropriate to each thread, or partition, executing on the system.

SUMMARY OF THE INVENTION

A high performance multiple-processor integrated circuit has multiple cache units and multiple instruction fetch and decode units, where each instruction fetch and decode unit is associated with a real or virtual processor. The integrated circuit also has at least one dynamically allocable cache unit, and may have additional cache units that are directly connected to particular processors.

The integrated circuit also has high-speed interconnect that permits use of the dynamically allocable cache units by more than one real or virtual processor, and a cache allocation register. Fields of the cache allocation register determine which real or virtual processor is permitted to access the dynamically allocable cache units.

In an embodiment, the dynamically allocable cache units form part of the second level of cache in the system. In this embodiment there are four processors, four fixed-size first level caches each associated with a processor, four fixed-allocation second-level cache blocks, and four dynamically-allocable second-level cache blocks.

The second level cache system is instrumented with hit-rate monitoring apparatus associated with each processor. An operating system driver monitors the hit-rate associated with each processor and tracks hit rates. Monitored hit rates are useful to determine which threads partitions may benefit from having additional cache assigned to them.

In a particular embodiment, the dynamically-allocable second-level cache blocks are assigned to processors of a particular partition of a partitionable machine. Machine time on this machine is billed according to how much dynamically allocated cache is allocated to each partition. In this embodiment, dynamically allocated cache is assigned at boot time or when partitions are reconfigured; partitions may be reconfigured according to a schedule as well as at boot time.

In an alternative, fine grained, embodiment, each thread is associated with a requested cache allotment. In this embodiment, dynamically allocated cache blocks are reallocated at context switch time such that performance is optimized. In this embodiment, the operating system may track hit rates associated with each thread as achieved with previously assigned cache allotments, and set the requested cache allotment according to an optimum cache size for each thread.

When the dynamically allocated cache is deassigned from one partition, or thread, and assigned to another, it is first purged by writing all "dirty" cache lines to memory, and clearing a "valid" bit for each cache line. In this way, the cache is made effectively empty to ensure that data associated with one partition is not available to another partition.

DETAILED DESCRIPTION OF THE EMBODIMENTS

Figure 1:
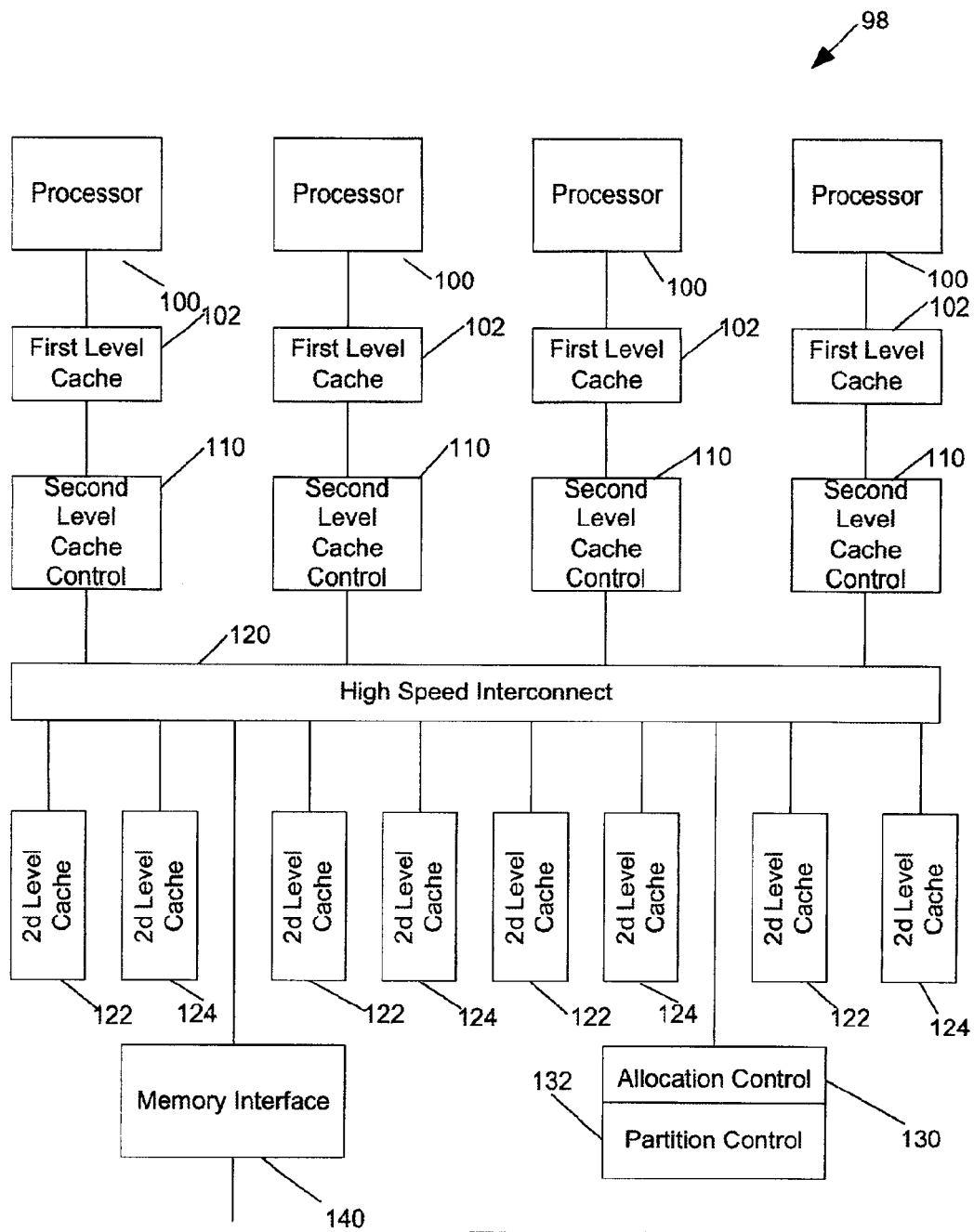
FIG. 1 is a block diagram of a multiple-processor integrated circuit having multiple blocks of dynamically allocable cache.

A partitionable multiple-processor integrated circuit 98 (FIG. 1) has several processors 100. Each processor performs memory references for instructions data through a first level cache 102. Those references that miss in first level cache are directed to second level cache controllers 110.

Each second level cache controller 110 is coupled to a high-speed interconnect 120. High-speed interconnect 120 allows the second level cache controllers 110 to each access one or more of a plurality of cache memory blocks 122 and 124. Of these memory blocks, at least one is an allocable cache memory block 124 that may be allocated to any cache controller 110. There may, but need not, be one or more cache memory blocks 122 for which allocation is fixed. Allocation controller 130 determines which, if any, of the dynamically allocated cache memory blocks 124 is accessed by each cache controller 110. Partition control 132 operates to determine which processors are associated with each system partition. Partition control 132 and allocation controller 130 therefore together determine the second level cache controller 110, processor 100, and system partition each allocable cache memory block 122 and 124 is associated with.

Cache references that are not located in first level cache 102, and not located in second level cache, are directed through a memory interface 140 to off-chip main memory (not shown).

Figure 2:
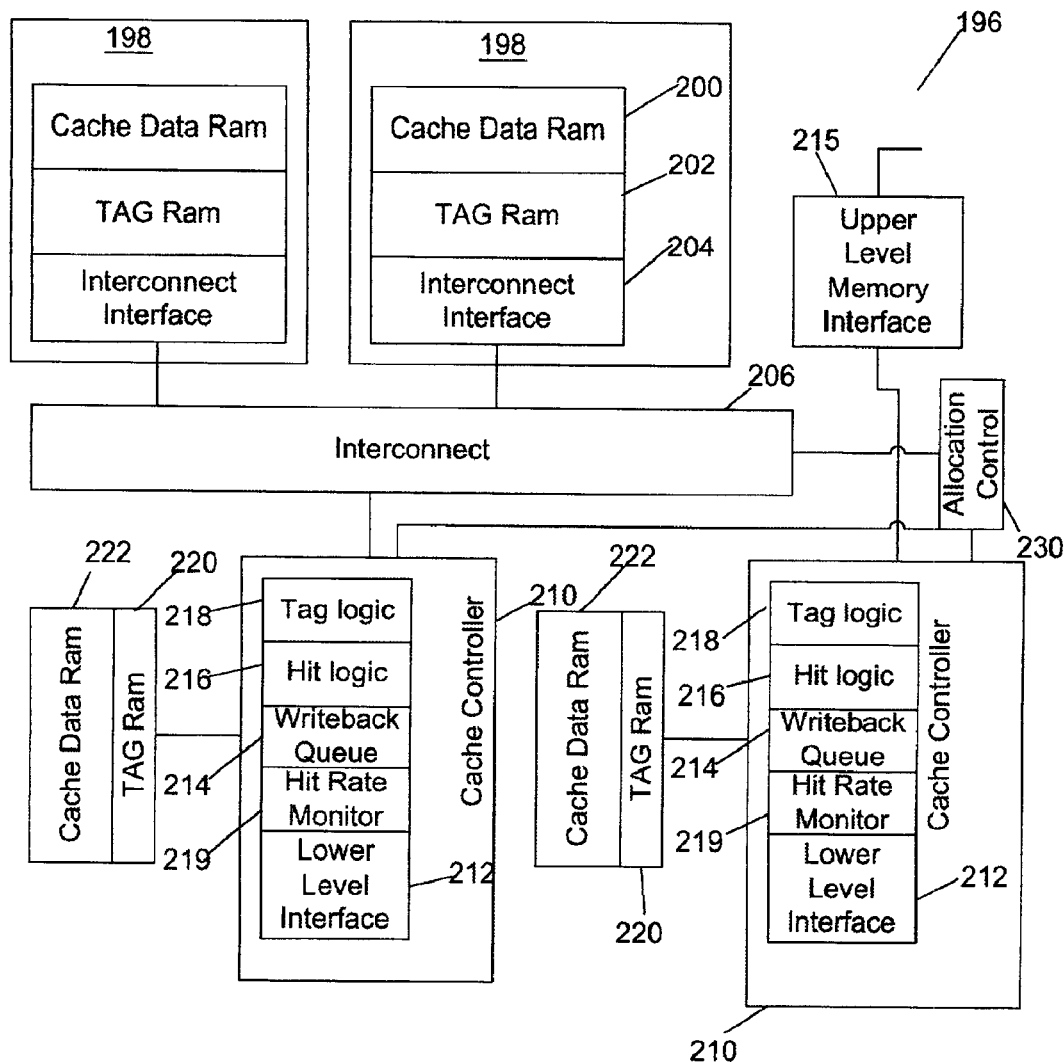
FIG. 2, a block diagram of a cache system having multiple blocks of dynamically allocated cache, for use in a multiple-processor integrated circuit.

In an alternative embodiment of the integrated circuit 196, each dynamically allocated cache memory block 198 (FIG. 2) incorporates data memory 200, tag memory 202, and an interface 204 to interconnect 206. Each cache controller 210 has an interface 212 for receiving memory references that miss in lower level cache. Each cache controller 210 also has cache control logic as known in the art, including a write-back queue 214 for tracking cache writes and controlling writeback to main memory or higher level cache through upper level memory interface 215, as well as tag logic 218 and hit logic 216 for determining those references that are located in cache. Each cache controller also incorporates hit rate monitor logic 219 for measuring cache performance including hit rate. The cache controller 210 has local tag memory 220 and data memory 222. Tag memory 220 and data memory 222 are sufficiently large that they can provide a high hit rate for some instruction streams that have small cache requirements.

Cache controllers 210 connect to interconnect 206, which allows them to communicate with dynamically allocated cache memory blocks 198 under control of allocation control 230. Allocation control 230 and interconnect 206 is configured by software to connect zero, one, or more dynamically allocated cache memory blocks 198 to each cache controller 210. Each dynamically allocated cache memory block 198 may only be accessed by only one cache controller 210 at any given time.

In an alternative embodiment, each cache controller 110 is provided with sufficient tag in the cache controller to control as many as four cache memory blocks 122 and 124. In this embodiment, dynamically allocated cache memory blocks 124 contain cache data memory.

Figure 3:
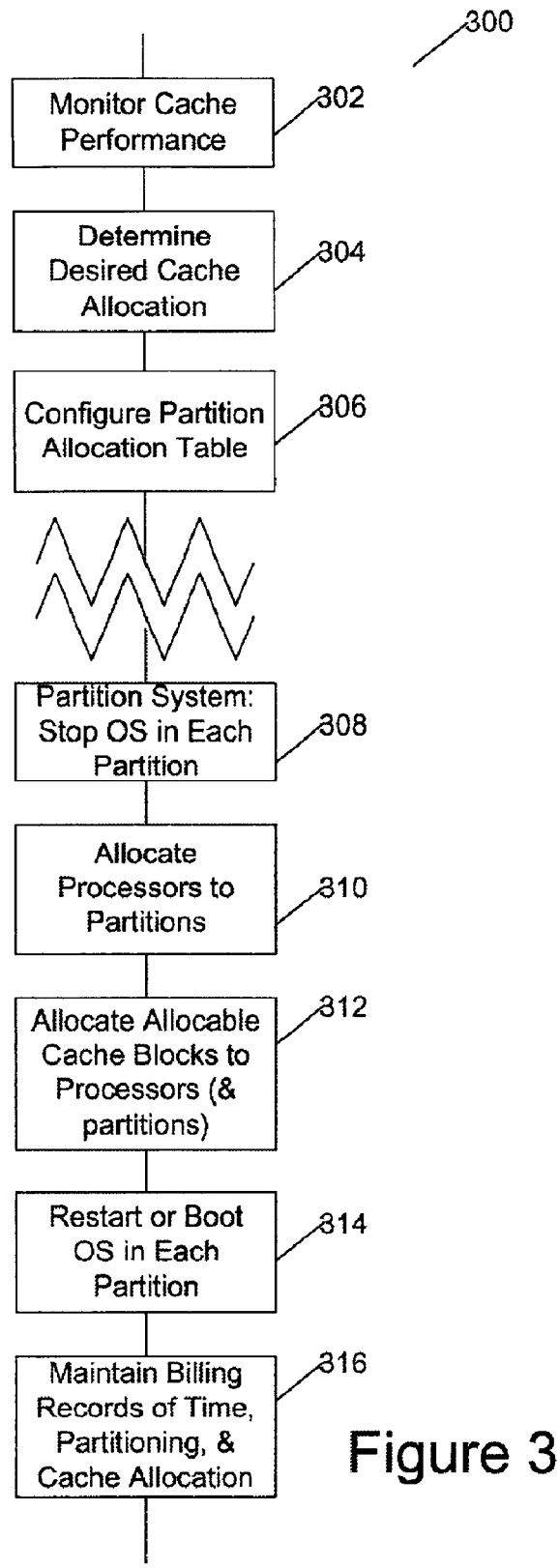
FIG. 3, a flow chart illustrating allocation of cache memory on a system utilizing the integrated circuit, and billing of processor time thereon.

A method 300 (FIG. 3) for managing a computer system built around one or more of the multiprocessor integrated circuits 98 (FIG. 1), includes monitoring 302 (FIG. 3) cache performance. Monitoring makes use of the hit rate monitor 219 shown on FIG. 2, and such other cache performance monitor apparatus as may be incorporated into the integrated circuits, to make a record of past cache performance of partitions, applications, and prior cache allocation. This record of past performance under various conditions is used to determine 304 a desired system partitioning taking into account cache availability on the one or more multiprocessor integrated circuits 98. In a particular embodiment, the volume of past interprocessor communications is also considered in determining which processors to place in each system partition. The determined partitioning is configured 306 into a partition allocation table.

The system is repartitioned each time it is booted, and is also capable of being dynamically repartitioned at other times when repartitoning is appropriate to improve overall system performance. Repartitioning requires that any running operating system in each affected partition be stopped 308. The processors 100 of each integrated circuit 98 are assigned 310 to partitions according to the partition allocation table. Then, the dynamically allocable cache blocks 124 are assigned 312 to processors 100 of each partition according to the partition allocation table. Next, the operating systems for each partition are booted, or restarted, 314; and billing records are maintained 316 of machine time, system partitioning, and cache allocation. These billing records permit charging customers according to the number of processors and amount of cache assigned to their applications.

While the invention has been particularly shown and described with reference to particular embodiments thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. A processor integrated circuit capable of executing more than one instruction stream comprising:
   a first processor, coupled to fetch instructions and access data through a first cache controller;
   a second processor, coupled to fetch instructions and access data through a second cache controller;
   a plurality of cache memory blocks;
   a high-speed interconnect coupling the plurality of cache memory blocks to the first and second cache controllers such that at least one allocable cache memory block is capable of being used by the first and second cache controllers; and
   a resource allocation controller coupled to determine an accessing cache memory controller selected from the group consisting of the first and second cache memory controllers, whereby the accessing cache memory controller is allowed to access the allocable cache memory block,
   wherein the cache memory blocks are usable by the cache controllers to store data and instructions fetched from a random-access memory.

2. The processor integrated circuit of claim 1, further comprising a plurality of first level cache systems, wherein the first processor fetches instructions and accesses data from the first cache controller through a first first level cache system, and wherein the second processor fetches instructions and accesses data from the second cache controller through a second first level cache system.

3. The processor integrated circuit of claim 1, wherein the cache memory blocks further comprise cache tag memory.

4. The processor integrated circuit of claim 1, wherein each cache controller is provided with cache hit rate monitoring apparatus.

5. A method of dynamically allocating cache on a multiple-processor integrated circuit, where the multiple processor integrated circuit is used in a partitionable multiple-processor system and comprises:
   a plurality of processors each coupled to receive instructions from a first level cache associated therewith,
   a plurality of allocable upper level cache memory blocks, interconnect apparatus for transmitting cache misses at each first level cache to upper level cache memory blocks assigned thereto, and
   allocation apparatus for assigning upper level cache memory blocks to processors;
   the method comprising the steps of:
   monitoring past cache performance associated with processors and partitions;
   determining desired processor to partition and upper level cache block allocations to processors; and
   repartitioning the system, the step of repartitioning the system including allocation of upper level cache blocks to processors of at least one of the multiple processor integrated circuits,
   wherein the upper level cache blocks are usable to store data and instructions fetched from a random-access main memory.

6. The method of claim 5, wherein the upper level cache blocks are second level cache blocks.

7. The method of claim 5, further comprising the step of billing customers according to processor time and allocated cache.

8. The method of claim 5, wherein the multiple processor integrated circuit further comprises a plurality of non-allocable cache memory blocks.

9. The method of claim 5, wherein the interconnect apparatus further comprises a plurality of upper level cache controllers, and where each upper level cache controller is capable of controlling operation of the allocable cache memory blocks as a writeback cache.

10. The method of claim 5, wherein each upper level allocable cache block further comprises tag memory and cache data memory.

11. The method of claim 10, further comprising the steps of stopping execution of operating systems in each partition, and restarting execution of operating systems in each partition, and wherein the system is capable of being repartitioned without rebooting each operating system.

* * * * *